Dec. 31, 1968  R. D. STOTTLE  3,419,438

HEAT FLUX MEASURING DEVICE

Filed May 25, 1964

Robert D. Stottle,
*INVENTOR.*

BY *Charles Q. Phillips*

ATTORNEY

United States Patent Office 3,419,438
Patented Dec. 31, 1968

3,419,438
HEAT FLUX MEASURING DEVICE
Robert D. Stottle, Huntsville, Ala., assignor to Heat Technology Laboratory, Inc., Huntsville, Ala., a corporation of Alabama
Filed May 25, 1964, Ser. No. 369,984
9 Claims. (Cl. 136—230)

ABSTRACT OF THE DISCLOSURE

A heat flux measurement device having a metallic target of relatively high ratio of exposed area to thickness connected through a low thermal conductivity material to a heat sink. Electrical readings representative of heat flux experienced by the disc are available across two output leads connected to the disc and heat sink, respectively.

---

This invention relates in general to the field of heat measurement and particularly to a novel and improved heat flux measuring device.

The measurement of heat flow, heat transfer or heat flux is accomplished in several ways and with varying degrees of overall success. A variety of devices and techniques have been employed in an effort to achieve desired ranges of measurement, response times, and sensitivity. In perhaps the majority of cases, individual or combinations of thermo-couples have been employed following largely accepted techniques and practices which have evolved from the art of temperature measurement.

Two basic approaches have been followed utilizing temperature measurements. One involves the concept of thermal capacity wherein the temperature rise of a known mass, such as a metal slug, is related to the rate of heat transferred to the mass.

A second approach involves the concept of thermal gradient, the rate of energy transferred to a substance, such as a metal disc, and is related to a measurable temperature gradient on or within the disc. The latter approach is perhaps more widely employed and an example of a device following it is the well-known "Gardon" gage which is illustrated herein. Basically it consists of a constantan foil target or heat receiving disc, to the center of which is connected a copper lead making a "hot" thermoelectric junction.

To the periphery of the disc is connected a copper heat sink, forming a peripheral "cold" thermoelectric junction. A second copper lead is connected to the copper heat sink and the output of the device appears across the two copper leads. Heat flux is measured by measuring the temperature difference or gradient by subtracting the hot and cold junction voltages, an effect implicit in the interconnections of the junctions.

A related but somewhat different technique, which indirectly involves heat measurement, is disclosed in Cole Patent 2,938,122. This patent directly deals with the problem of the measurement of electronic radiation (and is not known to have been employed as a heat flux measuring device) but the ultimate mode of measurement involves the heat absorbed by a targe disc bombarded by by high velocity electrons.

The present invention has as its object to provide improvements in the area of sensitivity, range of operations, and structural simplicity over presently known techniques and devices.

In accordance with the invention a metallic target disc of a predetermined exposed surface area is positioned with or along the path of heat flux to be measured. The disc has a relatively high ratio of exposed area to thickness. A combined heat-electrical path connects the disc to a heat sink or heat storage means having a relatively high heat capacity.

This path is provided by a metallic wire or rod of a material having a relatively low thermal conductivity characteristic when compared with the disc and heat sink. Thus a "hot" thermoelectric junction is made at a point where the heat-electrical path connects to the disc and a "cold" junction made where the path connects to the heat sink. Then a non-thermoelectric junction connection (but an electrical connection) is made to some point on the disc to provide a first electrical output lead and a non-thermoelectric junction connection made to some point on the heat sink to provide a second electrical output lead. Electrical readings representative of heat flux experienced by the disc are available across the two output leads.

While the heat flux device of the present invention is somewhat similar in form to the electron radiation meter of the Cole patent, a basic difference in construction and operation nevertheless exists in that Cole employs separate heat and electrical paths. In accordance with this invention the separate paths have been found to provide unneeded redundancy. In fact, the heat flow through the heat-only path allows heat to by-pass or shunt the electrical, or heat-electrical path and thus impair generally needed sensitivity of measurement.

Other objects, features and attendant advantages of the present invention will be apparent from the following detailed description when considered together with the accompanying drawings in which.

Figure 1:
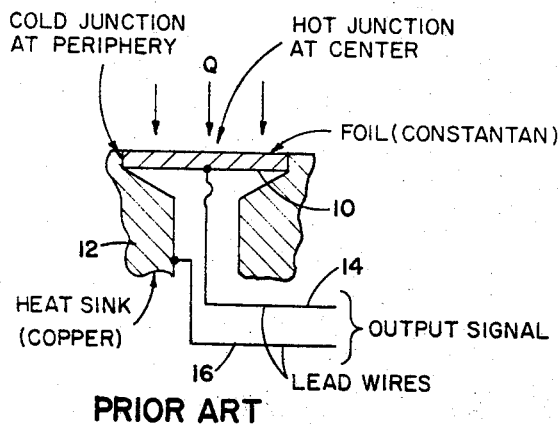
FIG. 1 is a cross-section view of a heat flux measuring device widely employed in the prior art.

FIG. 1 illustrates the prior art discussed above, and perhaps the most widely used device of its class, wherein a constantan foil disc 10 is joined at its periphery to a metal block, copper heat sink 12. One output signal lead 14, of copper material, is connected to the center of disc 10 to form a "hot" thermocouple or thermoelectric junction. A "cold" thermoelectric junction is formed, as discussed above, at the periphery of the constantan foil where it joins heat sink 12. To complete the electrical circuit a copper lead wire 16 is connected to the heat sink. This type of heat flux measuring device has the feature that incident heat is actually received between the "hot" and "cold" junctions which provide the measurement. A distinct disadvantage of this device is the relatively substantial surface area of constantan between the two junctions required by this configuration in order to receive sufficient heat flux for thermoelectric response. A second disadvantage is the variation in surface temperature across the foil.

Figure 2:
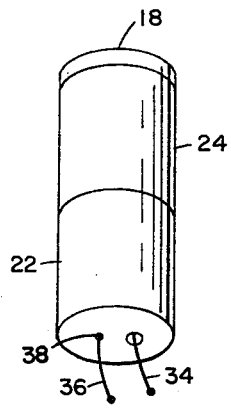
FIG. 2 is a pictorial view of one embodiment of the invention.
Figure 3:
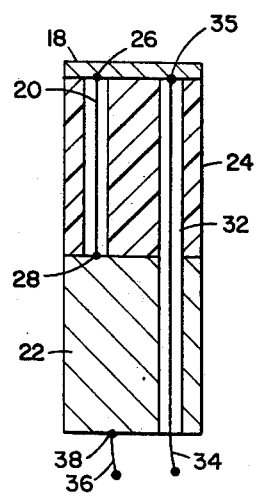
FIG. 3 is a cross-section view of the embodiment of the invention shown in FIG. 2.

Considering the present invention, first as illustrated in FIGS. 2 and 3, heat is received by thin metal disc 18 having a predetermined exposed surface area and instead of the heat being discharged across a path of substantial dimensions, is discharged thru a relatively fine rod or wire 20, which is not a radiant receiver of heat, to metal heat sink 22. Disc 18, typically of copper as would be heat sink 22, is supported by a ceramic or other heat and electrical insulating material base 24, being cemented to heat sink 22 and disc 18. Wire 20, which provides the heat discharge path, is of a metallic material which is less thermally conductive than disc 18 and heat sink 22, such as constantan. It provides a hot thermoelectric junction at point 26 on disc 18 and a cold thermoelectric junction at point 28 on heat sink 22. Thus disc 18 and heat sink 22 are of one type material and wire 20 of another, wherein the differing materials are mutually thermoelectrically responsive. Wire 20 passes thru a passageway 30, not critical of location, extending between disc 18 and heat sink 22. A second passageway 32, which likewise is not critical of location, extends thru both heat sink 22 and supporting base 24 thru which output lead 34 connects to any point 35 on disc 18. The second output lead 36 connects to any point 38 on heat sink 22, to complete the thermoelectric circuit.

By providing the insulating supporting base 24 for disc 18, the restricted heat path provided by wire 20 can be made very small and thus substantial temperature differences between point 26 and point 18 obtained with small heat flux rates. This embodiment is particularly adapted to provide extreme sensitivity in the range of low heat flux measurement.

Figure 4:
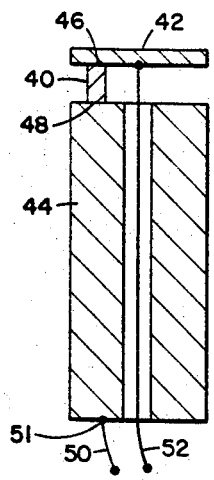
FIGS. 4 and 5 are cross-section views of other embodiments of the invention.

FIG. 4 illustrates a variation of the embodiment of the invention shown in FIGS. 2 and 3 in that the heat path, a wire or small rod 40, coupling the heat receiving disc 42 and heat sink 44 is also a supporting member for disc 42. The heat insulating medium between disc 42 and heat sink 44 in this instance is air which insulates the two except as by-passed by rod 40. However, as in the case of the embodiment shown in FIGS. 2 and 3 there is a combined heat-electrical connection between disc 42 and heat sink 44 thru rod 40 so that all heat flow is employed to influence the thermoelectric junctions. These thermoelectric junctions are at points 46 (hot) and 48 (cold) and no other thermal connections or thermoelectric junctions are necessary. In this regard it will be noted that in the Cole patent, while in effect two sets of thermoelectric junctions are formed, one set being the junctions between heat transfer means 14 and disc 12 and sink 13, this set is not used or discussed as such in the patent. Thus to the contrary in FIG. 4, the electrical output of the heat flux measuring device is taken across terminal leads 50 and 52, wherein lead 50 is electrically connected to point 51 of heat sink 44 and lead 52 is electrically connected to disc 42. Disc 42 and heat sink 44 are of a generally higher thermally conductive material than wire or rod 40.

Figure 5:
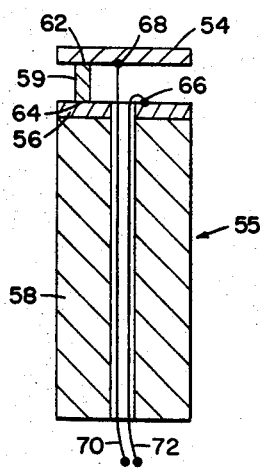

FIG. 5, showing still another embodiment of the invention features a type construction wherein heat receiving disc 54 is of a type material, such as constantan, which is easier to weld than copper, but generally unsuitable for a heat sink. Thus heat sink 55 consists of a matching first layer 56 of constantan and a second and more massive layer 58, of copper (or other high heat capacity material). As in the case of the other embodiments, wire or rod 59, is of a material which is less thermally conductive than disc 54 and first layer 56. An example of material for rod 59 is Chromel. Thermoelectric junctions exist at point 62, the hot junction, and point 64, the cold junction. Electrical output leads are connected to point 66 of layer 56 and to point 68 of disc 54. The output leads, being lead 70 and lead 72, may be connected to points other than those illustrated, it being essential only that lead 70 be connected to some point on disc 54 and that lead 72 be connected to some point on layer 56. Because of the substantial connecting surfaces of layers 56 and 58 layer 56 is held to substantially the temperature of the more massive and effective heat sink layer 58.

Figure 6:
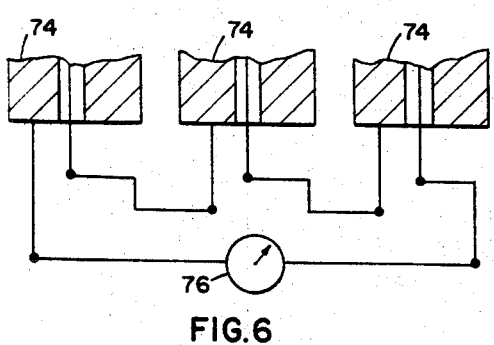
FIG. 6 is a schematic circuit diagram illustrating the interconnection of a plurality of heat flux measuring units.

FIG. 6 illustrates the interconnection in series of flux measurement units 74 of a type illustrated in FIGS. 2 thru 5. By such interconnection to output meter 76 the individual outputs are additive and much greater sensitivity can be achieved. Due to the more compact construction taught by this invention, greater numbers of flux measuring devices may be clustered than when employing the common "Gardon" type gage.

Due to increased requirements for sensitivity of instrumentation in the field of heat flux measurements, as for example in missilery, the present invention is particularly of value. In addition it has been found to provide excellent accuracy, with a basic simplicity of design.

As stated above, its compactness is a further feature, allowing, for example, the clustering of as many as one hundred or more, heat flux units into a one inch crosssection measurement port.

Obviously many modifications and variations of the present invention, including choices of materials and shape of components, are possible in the light of the above teachings. It is therefore to be understood that within the scope of the appended claims the invention may be practiced other than as specifically described.

What is claimed is:
1. A heat flux measuring device comprising:
 (A) heat receiving means for receiving a predetermined volume of heat flow and comprising:
  (1) a metal disc having a predetermined surface area, and
  (2) said disc being of one of two mutually thermoelectrically responsive materials;
 (B) heat storage means having a relatively large heat capacity and comprising an electrically conductive heat sink of said one type of thermoelectrically responsive material, said heat sink being spaced from said metal disc;
 (C) a combined heat-electrical path between said metal disc and said heat sink comprising a material of the other of said two types of thermoelectrically responsive materials;
 (D) an insulating medium electrically and thermally separating said metal disc and said heat sink except as otherwise provided by said combined heat-electrical path;
 (E) electrical output means comprising:
  (1) a first electrical conductor of a material electrically similar to said metal disc and electrically connected at one end to said metal disk and at the other end comprising a first output terminal, and
  (2) a second electrical conductor of a material electrically similar to the material of said heat sink and electrically connected at one end to said heat sink and at the other end comprising a second output terminal.

2. The heat flux measuring device set forth in claim 1, wherein said material comprising said combined heat-electrical path is of a relatively low thermally conductive material.

3. The heat flux measuring device set forth in claim 1, wherein said insulating medium substantially fills the space between said metal disk and said heat storage means and provides a physical support for said metal disc.

4. A heat flux measuring device comprising:
 (A) a plurality of thin metal discs, each being of a relatively high thermally conductive material;
 (B) a plurality of metal heat sinks spaced from said metal discs, each said sink being of a relatively high thermally conductive material;
 (C) a plurality of first electrical conductors wherein:
  (1) a said first conductor electrically interconnects one of said discs and one of said heat sinks, and
  (2) said first electrical conductors are of a relatively low thermally conductive material;
 (D) a plurality of second electrical conductors wherein:
  (1) each of said second electrical conductors interconnects one of said metal discs to one of said heat sinks which are not so interconnected by said first conductors, and
  (2) each of said second conudctors being of a relatively high thermally conductive material.

5. The heat flux measuring device set forth in claim 4, wherein said metal discs are physically clustered adjacent to each other.

6. The heat flux measuring device set forth in claim 5, wherein said metal discs are of copper and said first conductors are of constantan.

7. The heat flux measuring device set forth in claim 5, wherein said metal discs are of constantan and said first conductors are of Chromel.

8. A heat flux measuring device comprising:
(A) heat receiving means comprising a copper disc having a predetermined surface dimension and having a relatively high ratio of surface area to thickness; and
(B) heat storage means spaced apart from said heat receiving means and comprising:
   (1) a metal block having a first cross-section corresponding substantially to one surface area of said metal disc,
   (2) a passageway through said metal block, and
   (3) at least a portion of said block being of copper;
(C) conductive means interconnecting said metal disc of said heat receiving means and said portion of said metal block of said heat storage means comprising a wire of constantan;
(D) a first copper conductor electrically connected at one end to said metal disc and passing through said passageway and providing a first electrical output terminal;
(E) an insulating medium separating said heat receiving means and said heat storage means for restricting heat and electrical flow between said metal disc and metal block relative to that heat and electrical flow of said conductive means; and
(F) a second copper conductor electrically connected to said portion of said metal block and providing a second electrical terminal.

9. A heat flux measuring device comprising:
(A) heat receiving means comprising a constantan disc having a predetermined surface dimension and having a relatively high ratio of surface area to thickness; and
(B) heat storage means spaced apart from said heat receiving means and comprising:
   (1) a metal block having a first cross-section corresponding substantially to one surface area of said metal disc,
   (2) a passageway through said metal block, and
   (3) at least a portion of said metal block being of constantan;
(C) conductive means interconnecting said metal disc of said heat receiving means and said portion of said metal block of said heat storage means comprising a wire of Chromel;
(D) a first constantan conductor electrically connected at one end to said metal disc and passing through said passageway and providing a first electrical output terminal;
(E) an insulating medium separating said heat receiving means and said heat storage means for restricting heat and electrical flow between said metal disc and metal block relative to that heat and electrical flow of said conductive means; and
(F) a second constantan conductor electrically connected to said portion of said metal block and providing a second electrical terminal.

References Cited

UNITED STATES PATENTS

| | | | |
|---|---|---|---|
| 935,154 | 9/1909 | Hopkins | 136—235 |
| 2,084,992 | 6/1937 | Claypoole | 136—230 |
| 2,640,357 | 6/1953 | Stephenson | 136—222 X |
| 3,123,996 | 3/1964 | Musial | 73—359 X |

ALLEN B. CURTIS, *Primary Examiner.*